H. NYQUIST.
ELECTRICAL MEASURING APPARATUS.
APPLICATION FILED SEPT. 3, 1920.
1,397,228.
Patented Nov. 15, 1921.
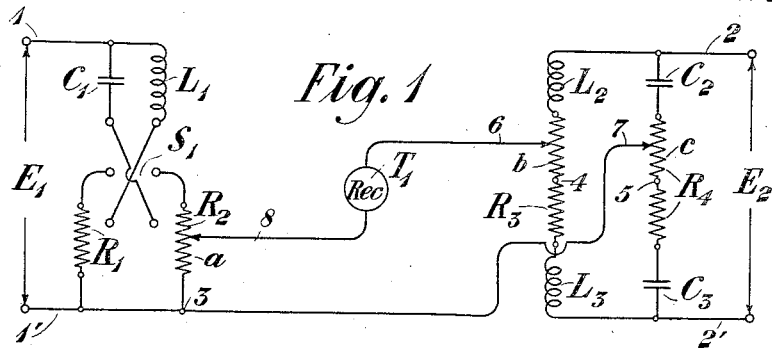
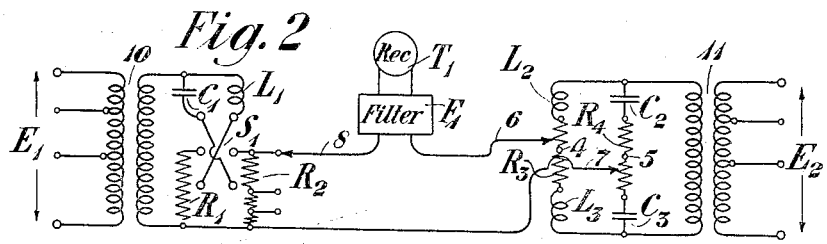
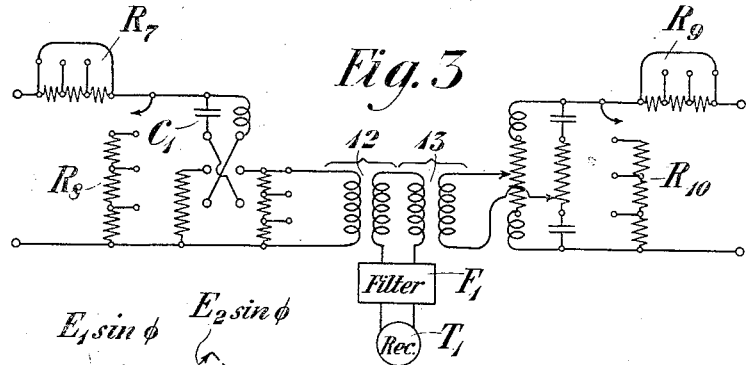
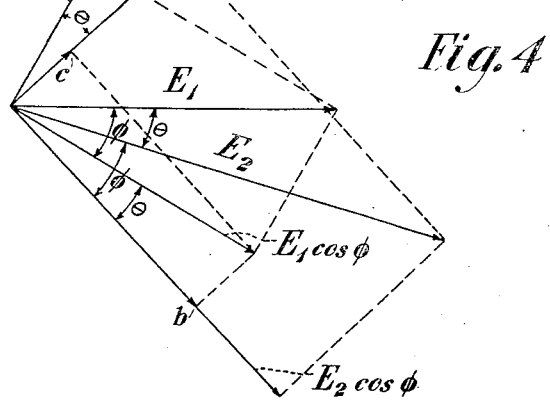
INVENTOR
H. Nyquist
BY
ATTORNEY

UNITED STATES PATENT OFFICE.

HARRY NYQUIST, OF TABOR, NEW JERSEY, ASSIGNOR TO AMERICAN TELEPHONE AND TELEGRAPH COMPANY, A CORPORATION OF NEW YORK.

ELECTRICAL MEASURING APPARATUS.

1,397,228.  Specification of Letters Patent.  Patented Nov. 15, 1921.

Application filed September 3, 1920. Serial No. 407,862.

*To all whom it may concern:*

Be it known that I, HARRY NYQUIST, residing at Tabor, in the county of Morris and State of New Jersey, have invented certain Improvements in Electrical Measuring Apparatus, of which the following is a specification.

This invention relates to electrical measuring apparatus, and particularly to a form of potentiometer adapted for comparing the magnitude and the phase relationship of two voltages or currents.

Potentiometers of the type heretofore used comprised variable inductance and capacitance units by means of which the magnitude and the phase relationship of the two voltage or current waves were determined. The use of variable inductance and capacitance units increases not only the cost of measuring apparatus of this type, but also the physical proportions of the apparatus, the latter increase being especially undesirable in the case of portable measuring sets.

It is the object of this invention to eliminate variable inductance and capacitance units by the use of a circuit so designed that the desired magnitude and phase measurements may be obtained by variable resistance units instead of the inductance and capacitance units.

This invention will be better understood from the following description when read in connection with the attached drawing, of which Figure 1 shows the general form of embodiment of this invention; Figs. 2 and 3 are modifications showing an arrangement for preventing longitudinal currents from interfering with the accuracy of the measurements; and Fig. 4 shows by vector diagram the relations between the voltages and currents when a balanced condition exists.

In Fig. 1 $C_1$, $C_2$ and $C_3$ represent three condensers, the capacity of $C_2$ and $C_3$ being respectively twice as large as that of $C_1$. $L_1$, $L_2$ and $L_3$ represent three inductances, the magnitude of $L_2$ and $L_3$ being respectively one-half that of $L_1$. $R_1$, $R_2$, $R_3$ and $R_4$, represent four resistance units of which the last three are variable. Resistances $R_3$ and $R_4$ are divided at the points 4 and 5 respectively, each half of said resistances being in magnitude equal to one-half that of either $R_1$ or $R_2$. The capacitance $C_1$ and the inductance $L_1$ are adapted for connection in series with either resistance $R_1$ or $R_2$, depending upon the position of the double pole, double throw switch $S_1$. A telephone receiver $T_1$ is connected between the movable contact of the variable resistance $R_2$ and the movable contact of the variable resistance $R_3$. One of the voltages to be compared designated $E_1$, is impressed across the left hand conductors 1 and 1' and the other voltage $E_2$ is impressed upon the right hand conductors 2 and 2'. The conductor 1' is connected by means of conductor 7 with the movable contact of the resistance $R_4$ associated with the right hand circuit. Similar symbols have been used to designate the corresponding parts in Figs. 2 and 3.

In Fig. 2 there are also shown the repeating coils or transformers 10 and 11. These transformers are provided with a number of taps taken from different parts of the winding so chosen that the impedance ratios of the transformers are even powers of 10. Also, in Fig. 2 the resistance $R_2$ is provided with certain finite steps instead of having a slide wire arrangement such as is shown in the corresponding position in Fig. 1. By means of this arrangement the factor $n$ hereinafter referred to may be made an even power of 10.

In Fig. 3 certain series and shunt resistances $R_7$, $R_8$, $R_9$ and $R_{10}$ are provided for the purpose of multiplying the impedance by powers of ten. This figure also shows a filter $F_1$ inserted between the telephone receiver $T_1$ and windings of the transformers 12 and 13. The transformers function to keep the longitudinal currents from entering said measuring circuit and the object of the filter is to suppress any harmonics of the impressed voltages that may be present, thereby making the measuring apparatus more sensitive.

In the arrangement of the apparatus shown in the figures the constants C, R and L are related by the equation $$CR^2 = L$$

$$\text{or } R = \sqrt{\frac{L}{C}}$$

The constant C represents the capacity of the unit $C_1$, L represents the inductance of the unit $L_1$ and R represents the resistance of the units $R_1$ or $R_2$. It has been shown in the copending application of Gannett and Kirkwood, Serial No. 376,996, filed April 27, 1920, that in a circuit in which $R = \sqrt{\frac{L}{C}}$, the impedance of the circuit equals R when no current flows in the receiver $T_1$. Consequently the measurement of currents is identical with the measurement of voltages, and furthermore, simple multipliers or shunts consisting of pure resistance elements may be used to vary the range and the impedance of this measuring instrument. These variable resistances are represented in the figures by the resistance elements $R_2$, $R_3$ and $R_4$.

This invention will be better understood from the following description of its mode of operation having in mind the foregoing description of the elements of the circuits. Let it be assumed that a voltage $E_1$ has been impressed upon the left hand conductors 1 and 1' and a voltage $E_2$ is impressed upon the right hand conductors 2 and 2' and it is desired to determine the ratio of the magnitude and phase difference of the voltages. Let it also be assumed that the movable contacts associated with resistances $R_2$, $R_3$, and $R_4$, are so adjusted that no current flows through the receiver $T_1$. Let $n$ represent the part or fraction of the resistance $R_2$ between the terminal 3 and the point upon which the moving contact rests. Since the resistance of $R_2$ equals R, the resistance of the $n$th part may be represented by $nR$, and will hereafter be referred to as "$a$". Furthermore let $q$ represent the fraction of the distance between the midpoint 4 of the variable resistance $R_3$ and the point on which the moving contact rests. The resistance, therefore, of that part included in the circuit may be represented by the expression $qR$ and will be referred to as "$b$". Also, if we represent by $r$ the distance between the midpoint 5 of the winding $R_4$ and the point upon which the movable contact rests, the resistance of the part included may be represented by $rR$ and will be referred to as "$c$". It will be seen that $n$ may have any value between zero and one, and $q$ and $r$ may each have any value from minus one half to plus one half.

Now suppose that an E. M. F.

$$E_1 = Ae \; j(pt+\alpha)$$

is applied to the left hand terminals in the figure and let $$E_2 = Be \; j(pt+\beta)$$

an E. M. F. be applied simultaneously to the right hand terminals, in which equations $p=2\pi f$, where $f=$ frequency in periods per second; A and B are constants representing the maximum values of the voltage waves; $e$ is the base of the Napierian logarithms; $t$ represents the instant of time at which $E_1$ and $E_2$ are measured; $\alpha$ and $\beta$ represent the phase angles of the respective waves.

If, as stated, the slide wires be so adjusted that there is no sound in the telephone receiver, the current in the inductive branch on the left is $$I_{aL} = \frac{E_1}{R+jp^L} = \frac{A}{R+jp^L} ej(pt+\alpha)$$

and that in the condenser branch is $$I_{ac} = \frac{E_1}{R+\frac{1}{jp^c}} = \frac{A}{R+\frac{1}{jp^c}} ej(pt+\alpha)$$

with the switch 3 in its upward position the drop in potential across $R_2$, between the movable contact and point 3, designated "$a$" is $$E_u = nRI_{aL} = \frac{AnR}{R+jp^L} e(jpt+\alpha)$$

when the switch is down it is $$E_d = nRI_{ac} = \frac{AnR}{R+\frac{1}{jp^c}} ej(pt+\alpha)$$

The midpoints 4 and 5 of the two variable resistances $R_3$ and $R_4$ are at the same potential, hence the drop in potential between the two conductors 6 and 7 is equal to the sum of the drops from the midpoints 4 and 5 to the conductors 6 and 7, designated $b$ and $c$ respectively.

Now the current in $b$ equals $$I_b = \frac{B}{R+jp^L} ej(pt+\beta)$$

and the drop between the conductor 6 and the middle point 4 is $$E_b = qRI_b = \frac{qRB}{R+jp^L} ej(pt+\beta)$$

The corresponding expressions for $c$ are $$I_c = \frac{B}{R+\frac{1}{jp^c}} ej(pt+\beta)$$

and $$E_c = rRI_c = \frac{rRB}{R+\frac{1}{jp^c}} ej(pt+\beta)$$

When there is no current in the receiver we have, if the adjustment is made with the switch up $$E_u = E_b + E_c$$

and if the adjustment is made with the switch down $$E_d = E_b + E_c$$

The expression for $E_u$ can be written $$\frac{AnR}{R+jp^L}ej(pt+\alpha) = \frac{qRB}{R+jp^L}ej(pt+\beta) + \frac{rRB}{R+\frac{1}{jp^c}}ej(pt+\beta)$$

$$\therefore \frac{AnR}{R+jp^L}ej(pt+\alpha) = \left(\frac{q}{R+jp^L} + \frac{r}{R+\frac{1}{jp^c}}\right)RBej(pt+\beta)$$

$$\therefore \frac{A}{B}ej(\alpha-\beta) = \frac{(R+jp^L)}{n}\left(\frac{q}{R+jp^L} + \frac{r}{R+\frac{1}{jp^c}}\right)$$

$$=\frac{q}{n} + \frac{r}{n}\frac{(R+jp^L)}{\left(R+\frac{1}{jp^c}\right)} = \frac{q}{n} + \frac{r}{n}\frac{(R+jpCR^2)}{\left(R+\frac{1}{jp^c}\right)}$$

$$=\frac{q}{n} + \frac{rjpCR(1+jpCR)}{(1+jpCR)} = \frac{q}{n} + \frac{jprCR}{n}$$

$$\therefore \frac{A}{B}ej(\alpha-\beta) = \frac{q}{n} + \frac{jprCR}{n}$$

The expression for $E_d$ becomes $$\frac{AnR}{R+\frac{1}{jp^c}}ej(pt+\alpha) = \frac{qRB}{R+jp^L}ej(pt+\beta) + \frac{rRB}{R+\frac{1}{jp^c}}ej(pt+\beta)$$

which reduces in a similar manner to $$\frac{A}{B}ej(\alpha-\beta) = \frac{r}{n} + \frac{q}{n(jpCR)}$$

To make the apparatus as nearly direct reading as possible $n$ should be unity or a power of ten, i. e., 1, 0.1, 0.01, etc. C can be chosen so that either CR or $2\pi CR$ is a power of ten. Then the equations become (disregarding position of the decimal point) either $$\frac{A}{B}ej(\alpha-\beta) = q + jpr,$$

$$\frac{A}{B}ej(\alpha-\beta) = q + jfr,$$

$$\frac{A}{B}ej(\alpha-\beta) = r + \frac{q}{jp}$$

or $$\frac{A}{B}ej(\alpha-\beta) = r + \frac{q}{jf}$$

where $f$ is the number of cycles per second. If a scale is supplied reading reciprocals Q, of $q$, the last two formulas may be made to take the form $$\frac{A}{B}ej(\alpha-\beta) = r + \frac{1}{jpQ}$$

and $$\frac{A}{B}ej(\alpha-\beta) = r + \frac{1}{jfQ}\text{resp.}$$

It should be noted that $r$, $q$ and Q may have both negative and positive values. By means of the foregoing equations, the ratio of the magnitudes and phase relations of the voltages may be calculated.

The arrangement of the voltages and the currents is shown clearly by means of vectors in Fig. 4. In this figure $E_1$ represents the voltage impressed upon the left hand conductors of Fig. 1, which normally is displaced by the angle $\alpha$ from a common reference point, and $E_2$ the voltage impressed upon the right hand conductors which normally is displaced by the angle $\beta$ from a common reference point. These voltages have a phase difference represented by the angle $\Theta$ which equals $\alpha-\beta$. The current in the inductive branch of the left hand circuit $I_{aL}$ equals $\frac{E_1}{R}\cos\Phi$ and lags behind the voltage $E_1$ by an angle $\Phi$. The drop across the resistance in this branch is in phase with the current and equals $E_1\cos\Phi$. This voltage drop is represented by $E_1\cos\Phi$ in the figure. Similarly the drop across the resistance in the condenser branch equals $E_1\sin\Phi$ and leads the drop across the resistance in the inductive branch by ninety degrees. It is represented by $E_1\sin\Phi$ in the figure. Similarly the drops across the resistance in the inductive branch and condenser branch of the right hand circuit is represented by $E_2\cos\Phi$ and $E_2\sin\Phi$ respectively. The phase relations of these four vectors is that indicated in the figures.

When balance is obtained $E_1\cos\Phi$ equals the vector sum of the vectors marked $b$ and $c$. But $b$ equals $q$ times $E_2 \cos \Phi$ and $c$ equals $r$ times $E_2 \sin \Phi$.

Hence $$qE_2 \cos \Phi = E_1 \cos \Phi \cos \Theta$$
$$\text{and } rE_2 \sin \Phi = E \cos \Phi \sin \Theta$$

that is $$\cos \Theta \; E_1 = qE_2$$
$$\sin \Theta \; E_1 = rE_2 \tan \Phi$$

which can also be written $$E_1 = E_2 \sqrt{q^2 + r^2 \tan^2 \Phi}$$

$$\tan \Theta = \frac{r}{q} \tan \Phi$$

If the circuits of which the voltages and the currents are to be measured have electrical connections therebetween, it may happen that longitudinal currents will flow which will effect the accuracy of the measurements. This may be prevented or substantially minimized by means of the arrangements shown in Figs. 2 and 3. By means of the transformers 10, 11, 12, and 13 the longitudinal currents are prevented from entering the circuit of the measuring apparatus and consequently the accuracy of the measurement is not affected.

It will be seen from the foregoing description that this invention provides a potentiometer in which the range of measurement and the impedance of the circuit may be varied by the use of variable resistances, which may be either of the slide wire or step by step type.

Although this invention has been disclosed in certain form or embodiment of parts it is plain that it is capable of embodiment in other forms without departing from the spirit and scope of the appended claims.

What is claimed is:

1. In an electrical measuring system adapted to compare two alternating currents, the combination of means for separating each of said currents into two components, the components of each current differing in phase by ninety degrees; means for balancing the drop in potential across a known resistance caused by one of the components of one current against the vector sum of the drops in potential across two known resistances resulting from the two components of the other of said currents.

2. In an electrical measuring system adapted to compare two alternating currents, the combination of two networks, each of said networks comprising two branches, one branch containing capacitance and resistance and the other containing inductance and resistance, the resistance, inductance and capacitance being so proportioned that the resistance equals the square root of the ratio of the inductance to the capacity and a circuit comprising indicating means to balance the drop in potential across a known resistance of one of said networks against the vector sum of the drops across known resistances in the two branches of the other of said networks.

3. In an electrical measuring system adapted to compare two alternating currents, the combination of a network comprising two shunt paths in parallel, one of the said paths containing known inductance and resistance in series and the other of said paths containing known capacitance and resistance in series, a second network comprising two shunt paths, one of said paths containing inductance and resistance in series, the said inductance and resistance units being uniformly disposed on each side of the midpoint of said path and of such magnitude that the impedance of the said path shall be the same as the corresponding path of the said first network, and the other path containing capacitance and resistance in series, the said capacitance and resistance being uniformly disposed on each side of the midpoint of the path, and of such magnitude that the impedance of the path will be the same as the corresponding path of the said first network, and a circuit comprising indicating means to balance the drop in potential across the resistance of one of the paths of said first network against the vector sum of the drops across the resistances of the two paths of the said second network.

4. In an electrical measuring system adapted to compare two alternating currents, a combination of two networks comprising resistance, capacitance and inductance across each of which networks is impressed an alternating electromotive force, a circuit in which the drop in potential across a resistance of one network is balanced by the vector sum of the drops across two resistances of the said second network, the said circuit including means to indicate a balanced condition and filtering means to exclude harmonics of the impressed electromotive force whereby sensitivity of the instrument may be increased.

5. In an electrical measuring system adapted to compare two alternating currents, the combination of two networks across each of which an alternating electromotive force is applied and a balancing circuit adapted to have impressed thereon an electromotive force by each of the said networks and having means to indicate when opposing electromotive forces are balanced, the said indicating means having a filter associated therewith, whereby the harmonics of the impressed electromotive forces may be excluded.

6. In an electrical measuring system adapted to compare two alternating currents, a combination of two networks each having associated therewith a transformer whereby an alternating voltage may be impressed upon the said networks and a balancing circuit comprising indicating means wherein the drop in potential across a resistance element of one of said networks may be opposed to the vector sum of the voltage drops across two resistances of the said second network, and means to exclude from said indicating means, harmonics of the impressed voltages.

In testimony whereof, I have signed my name to this specification this 2nd day of September 1920.

HARRY NYQUIST.